US012808230B2

(12) United States Patent
Chibli

(10) Patent No.: US 12,808,230 B2
(45) Date of Patent: Nov. 24, 2026

(54) LOW-VOLTAGE ACCESS CONTROL DEVICE

(71) Applicant: Omar Chibli, Dallas, TX (US)

(72) Inventor: Omar Chibli, Dallas, TX (US)

( * ) Notice: Subject to any disclaimer, the term of this patent is extended or adjusted under 35 U.S.C. 154(b) by 662 days.

(21) Appl. No.: 17/816,166

(22) Filed: Jul. 29, 2022

(65) Prior Publication Data

US 2023/0146139 A1 May 11, 2023

Related U.S. Application Data

(63) Continuation-in-part of application No. 17/524,214, filed on Nov. 11, 2021, now abandoned.

(51) Int. Cl.
*E05B 47/00* (2006.01)
*E05B 65/10* (2006.01)

(52) U.S. Cl.
CPC .. *E05B 47/0012* (2013.01); *E05B 2047/0017* (2013.01); *E05B 2047/0023* (2013.01); *E05B 2047/0036* (2013.01); *E05B 2047/0073* (2013.01); *E05B 65/1053* (2013.01)

(58) Field of Classification Search
CPC ...... E05B 47/0012; E05B 47/02; E05B 47/63; E05B 65/1053; E05B 65/108; E05B 65/1046; E05B 65/10; E05B 65/1093; E05B 2047/0023; E05B 2047/0036; Y10T 292/0908; Y10T 292/1021; Y10T 292/0946; Y10T 292/385; Y10T 292/379; Y10T 292/1089
USPC .............................................................. 70/92
See application file for complete search history.

(56) References Cited

U.S. PATENT DOCUMENTS 3,533,298 A * 10/1970 Heinz ................. F16H 25/2006 74/424.72
4,821,456 A * 4/1989 Nogaki ................. E05F 15/673 49/362
4,976,476 A 12/1990 Cross et al.
6,119,538 A * 9/2000 Chang ..................... E05B 81/25 74/411

(Continued)

FOREIGN PATENT DOCUMENTS

CN 110029873 A * 7/2019 ......... E05B 47/0012
CN 111691759 A * 9/2020 ............. E05B 15/00

(Continued)

OTHER PUBLICATIONS

Adams Rite 3700/8700/8800 Rim Exit Device, Owner's Manual [online], Hanchett Entry Systems, Inc., an ASSA ABLOY Group Company, 2014, [retrieved Sep. 28, 2023], 16pg PDF, Retrieved from the Internet < URL: https://jmacfiles.s3.amazonaws.com/docs_3700-8700-8800_Rim_Exit_Device_Owners_Manual.pdf>.

(Continued)

*Primary Examiner* — Steven A Tullia
(74) *Attorney, Agent, or Firm* — Cherry Johnson Siegmund James PC; Darin Deaver

(57) ABSTRACT

A low-voltage, direct current apparatus for controlling a door. The apparatus may comprise a mounting bar configured to be coupled to the door and a latch coupled to the mounting bar. The latch may comprise a locking lever, and an actuator may be configured to move the locking lever between a locked position in which the locking lever prevents movement of the latch to an unlocked position in which the locking lever allows movement of the latch.

10 Claims, 6 Drawing Sheets

(56) References Cited

U.S. PATENT DOCUMENTS

| | | | | |
|---|---|---|---|---|
| 6,189,939 | B1 * | 2/2001 | Zehrung | E05B 65/1053 70/92 |
| 6,394,508 | B1 * | 5/2002 | Zehrung | E05B 65/1053 70/92 |
| 7,052,054 | B2 * | 5/2006 | Luker | E05B 47/0012 292/201 |
| 9,939,054 | B2 * | 4/2018 | Stephenson | E05B 65/1053 |
| 10,400,476 | B2 * | 9/2019 | Grillo | E05C 19/003 |
| 11,459,795 | B2 * | 10/2022 | Ross | E05B 47/0012 |
| 11,466,499 | B2 * | 10/2022 | Elsmark | E05B 53/00 |
| 11,629,533 | B2 * | 4/2023 | Schroll | E05B 63/0073 292/137 |
| 11,674,333 | B2 * | 6/2023 | Milligan | E05B 63/0052 292/201 |
| 11,739,583 | B2 * | 8/2023 | Sorice | H02J 7/0042 49/25 |
| 11,898,373 | B2 * | 2/2024 | Woodley | E05B 47/0012 |
| 2004/0055345 | A1 * | 3/2004 | Moore | E05B 81/70 70/257 |
| 2007/0152455 | A1 * | 7/2007 | Ko | E05B 81/16 292/201 |
| 2008/0295550 | A1 * | 12/2008 | Schmidt | E05B 65/10 70/144 |
| 2010/0270814 | A1 * | 10/2010 | Labarre | E05B 47/0012 292/144 |
| 2013/0276488 | A1 * | 10/2013 | Haber | E05B 81/66 70/57.1 |
| 2019/0316382 | A1 | 10/2019 | Ross et al. | |
| 2020/0277806 | A1 * | 9/2020 | Sims | E05B 39/00 |
| 2022/0018162 | A1 * | 1/2022 | Bogdanov | E05B 65/1093 |
| 2024/0035306 | A1 * | 2/2024 | Chibli | E05B 47/0012 |
| 2024/0035310 | A1 * | 2/2024 | Chibli | E05B 47/0012 |
| 2024/0044176 | A1 * | 2/2024 | Chibli | E05B 47/0047 |

FOREIGN PATENT DOCUMENTS

| | | | | | |
|---|---|---|---|---|---|
| CN | 116624030 | A * | 8/2023 | E05B 65/10 |
| DE | 102016104765 | A1 * | 9/2017 | E05B 47/0012 |
| EP | 2484853 | A1 * | 8/2012 | E05B 47/0012 |
| EP | 2799647 | A1 * | 11/2014 | E05C 9/02 |
| FR | 2653480 | A1 * | 4/1991 | E05B 15/101 |
| FR | 2694328 | A1 * | 2/1994 | E05B 47/0012 |
| FR | 2816977 | A1 * | 5/2002 | E05B 47/0012 |
| WO | WO-2018035326 | A1 * | 2/2018 | E05B 15/0205 |

OTHER PUBLICATIONS

Adams Rite 8000|3000 Series Exit Devices, Brochure [online], Hanchett Entry Systems, Inc., an ASSA ABLOY Group company, 2020 [retrieved on Sep. 28, 2023], 8pg PDF, Retrieved from the Internet: <URL: https://content.assaabloyusa.com/doc/AADSS1067012&.pdf>.

* cited by examiner

LOW-VOLTAGE ACCESS CONTROL DEVICE

TECHNICAL FIELD

The invention set forth in the appended claims relates generally to systems and apparatuses for controlling access to a building, including, without limitation, electromechanical push bar exit devices.

BACKGROUND

Push bar exit devices, also known as crash bars or panic bars, are in widespread use in commercial buildings and allow occupants to quickly open a latched door by pressing a bar on the door. While such devices may be beneficial for emergency use, they are also generally more convenient than other types of exit devices.

While the benefits of push bar exit devices are widely known, improvements to such devices can significantly reduce cost of operation, including power and maintenance requirements.

BRIEF SUMMARY

New and useful systems and apparatuses for controlling access to a building are set forth in the appended claims. Illustrative embodiments are also provided to enable a person skilled in the art to make and use the claimed subject matter.

For example, some embodiments may comprise a low-voltage, direct current apparatus for controlling a door. The apparatus may comprise a mounting bar configured to be coupled to the door; a latch coupled to the mounting bar, the latch comprising a locking lever; and an actuator configured to move the locking lever between a locked position in which the locking lever prevents movement of the latch to an unlocked position in which the locking lever allows movement of the latch.

In more particular embodiments, the actuator may comprise a lead screw, a nut, and a motor. The nut may be threaded onto the lead screw and configured to engage the locking lever. The motor may be configured to rotate the lead screw in a first direction to push the nut against the locking lever, thereby moving the locking lever from the locked position to the unlocked position. The motor may also be configured to rotate the lead screw in a second direction to retract the nut from the locking lever. A spring may be configured to return the locking lever to the locked position if the motor retracts the nut from the locking lever. In yet more particular embodiments, the motor may be operable by direct current at less than twelve volts, and more preferably, less than nine volts.

In some embodiments, the latch may comprise a starwheel coupled to the mounting bar, and the actuator may be configured to move the locking lever between the locked position in which the locking lever prevents rotation of the starwheel to the unlocked position in which the locking lever allows rotation of the starwheel.

Additionally, or alternatively, some embodiments may comprise a system for controlling access to a door. For example, a system may comprise a strike configured to be coupled to a frame around the door; a mounting bar coupled to the door; and a latch coupled to the mounting bar and configured to engage the strike. The latch comprising a locking lever, and an actuator may be configured to move the locking lever between a locked position in which the locking lever prevents release of the latch from the strike to an unlocked position in which the locking lever allows release of the latch from the strike. An access control unit configured to operate the actuator. The access control unit may be operated by a source of direct current at less than twelve volts, and preferable less than nine volts. The source of direct current may be a battery, for example, which can also provide direct current to the actuator.

Features, elements, and aspects described in the context of some embodiments may also be omitted, combined, or replaced by alternative features. Other features, objectives, advantages, and a preferred mode of making and using the claimed subject matter are described in greater detail below with reference to the accompanying drawings of illustrative embodiments.

BRIEF DESCRIPTION OF THE DRAWINGS

The accompanying drawings illustrate some objectives, advantages, and a preferred mode of making and using some embodiments of the claimed subject matter. Like reference numbers represent like parts in the examples.

DESCRIPTION OF EXAMPLE EMBODIMENTS

The following description of example embodiments provides information that enables a person skilled in the art to make and use the subject matter set forth in the appended claims, but it may omit certain details already well known in the art. The following detailed description is, therefore, to be taken as illustrative and not limiting.

Figure 1:
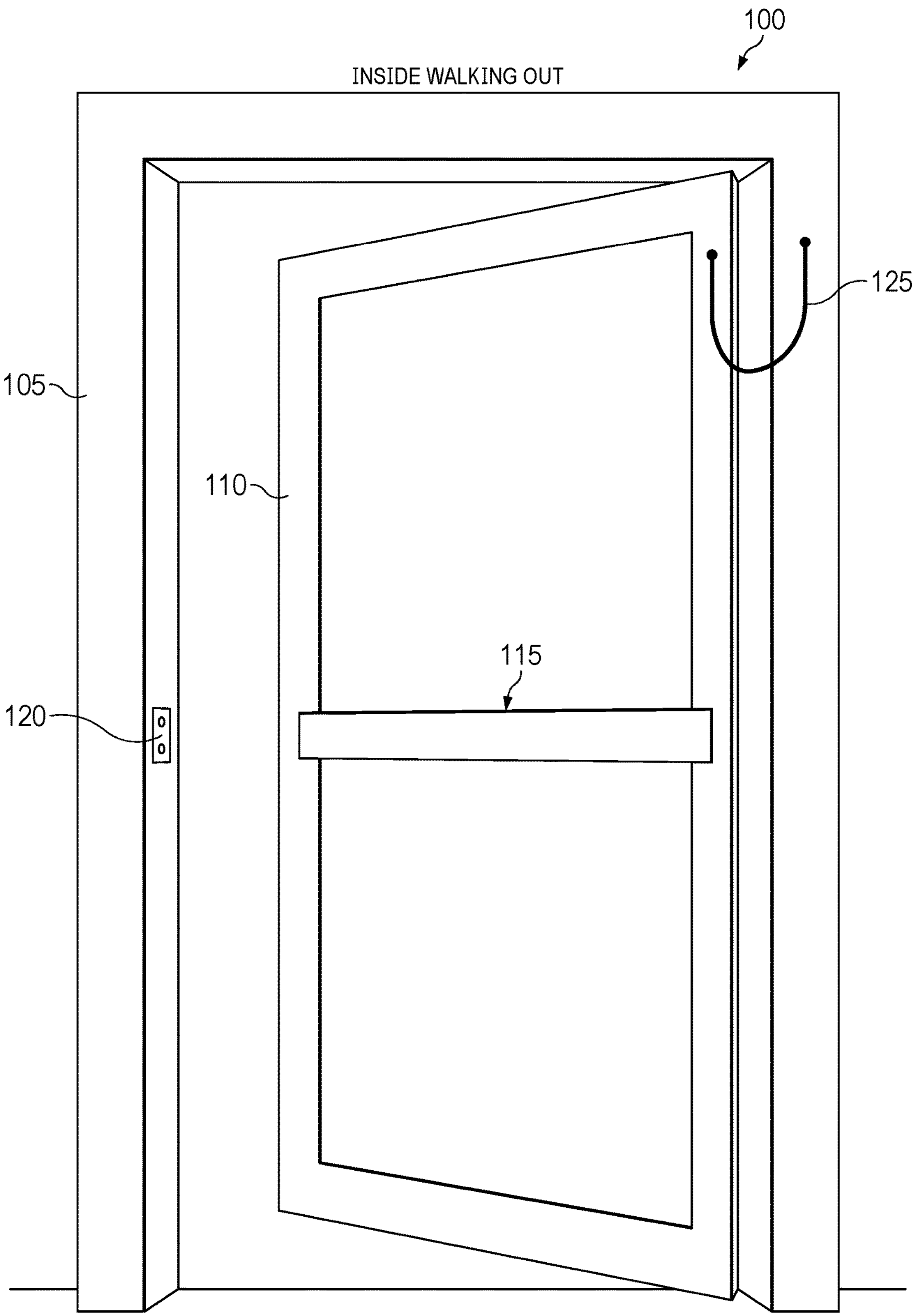
FIG. 1 is a schematic diagram of an example of a system for controlling access to a building.

FIG. 1 is a schematic diagram of an example of a door system 100. In the example of FIG. 1, the door system 100 comprises a door frame 105 and a door 110 configured to open to the exterior of a structure. The door system 100 may additionally comprise an exit device 115, a strike 120, and a transfer loop 125. For example, the exit device 115 may be coupled to the door 110, and the strike 120 may be coupled to the door frame 105. The transfer loop 125 may comprise or consist essentially of an electrical conductor between the door frame 105 and the door 110.

Figure 2:
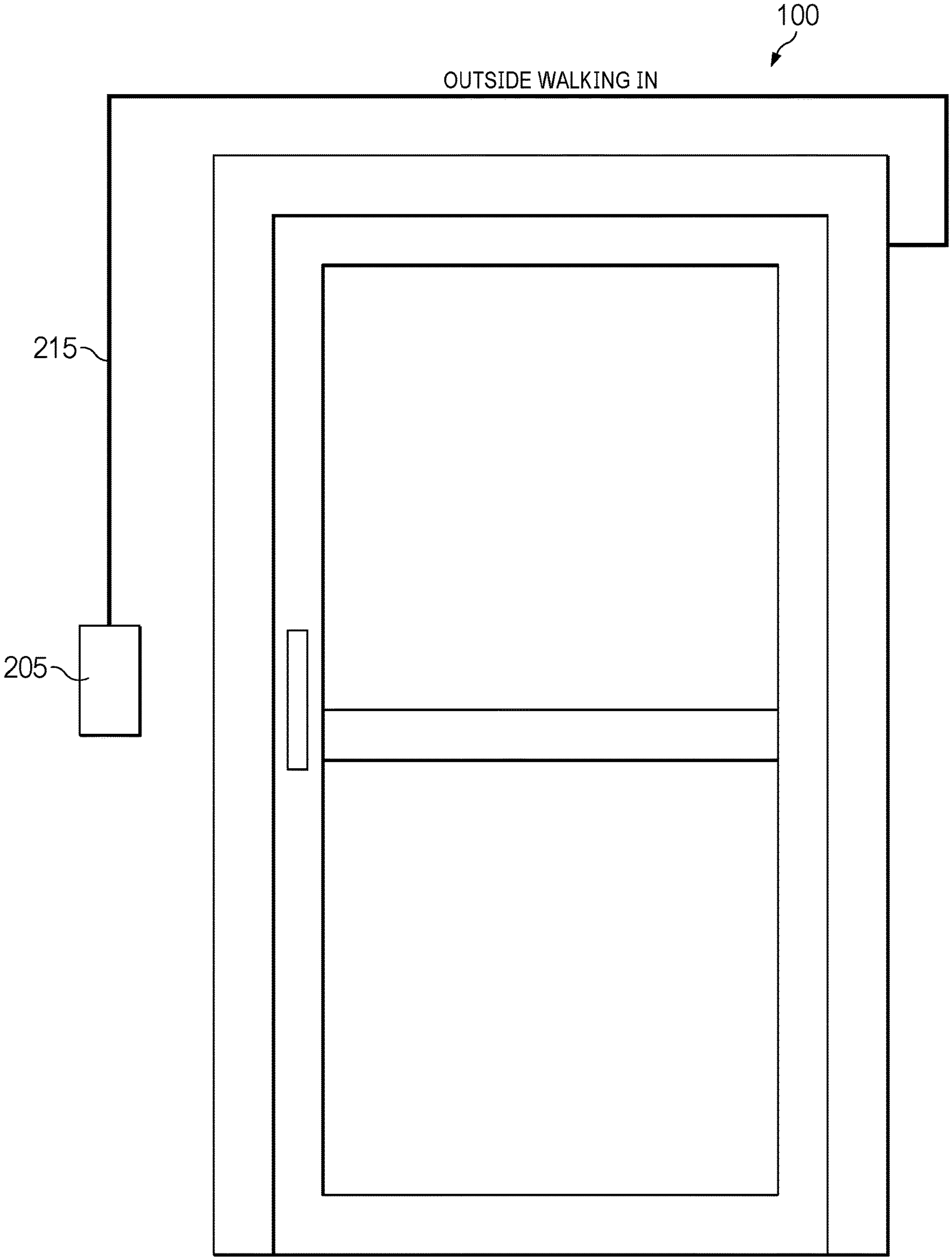
FIG. 2 is another schematic diagram of the system of FIG. 1.

FIG. 2 is another schematic diagram of the door system 100 of FIG. 1, illustrating additional details from the opposite side that may be associated with some embodiments. For example, the door system 100 of FIG. 2 may have an access control unit 205 and a conductor 210. In some embodiments, the access control unit 205 may be configured to read or receive a signal from an identification unit (not shown), such as a radio frequency identifier (RFID), a magnetic stripe card, keypad, biometric scanner, or Bluetooth device. The access control unit 205 may be powered by relatively low-voltage, direct current source, such as a battery having a voltage in a range of about three (3) volts to about nine (9) volts. The conductor 210 may electrically couple the access control unit 205 to the exit device 115 (shown in FIG. 1).

Figure 3:
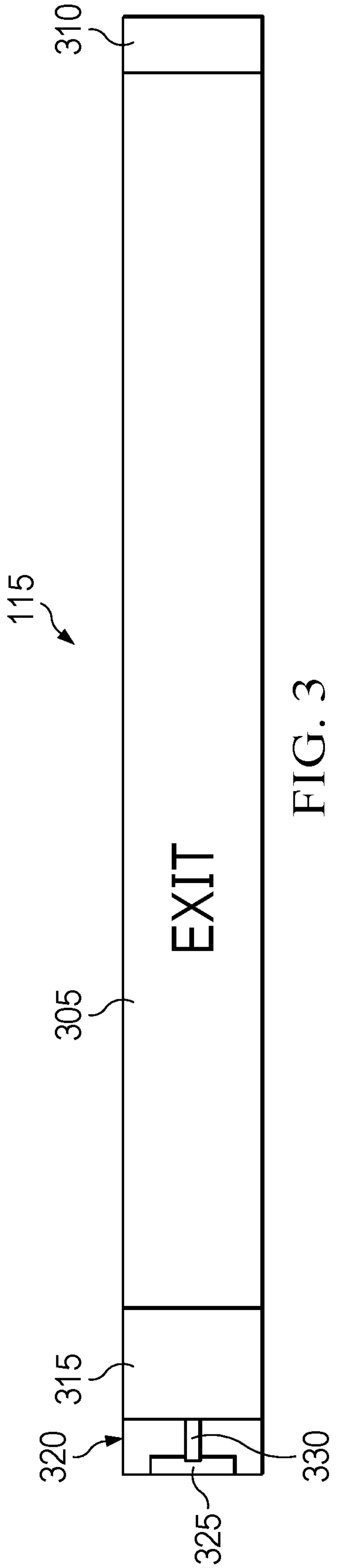
FIG. 3 is a top view of an example of an exit device that may be associated with the system of FIG. 1.

FIG. 3 is a top view of an example of the exit device 115 of FIG. 1, illustrating additional details that may be associated with some embodiments. In the example of FIG. 3, the exit device 115 generally comprises an activation bar 305, an end cap 310, a front cap 315, and a latch 320, which may be configured to engage the strike 120. The latch 320 of FIG. 3 comprises a nose guard 325 and a starwheel 330, which can engage the strike 120. In other embodiments, the latch 320 may comprise or consist of other types of fasteners, such as a slam latch or bolt.

Figure 4:
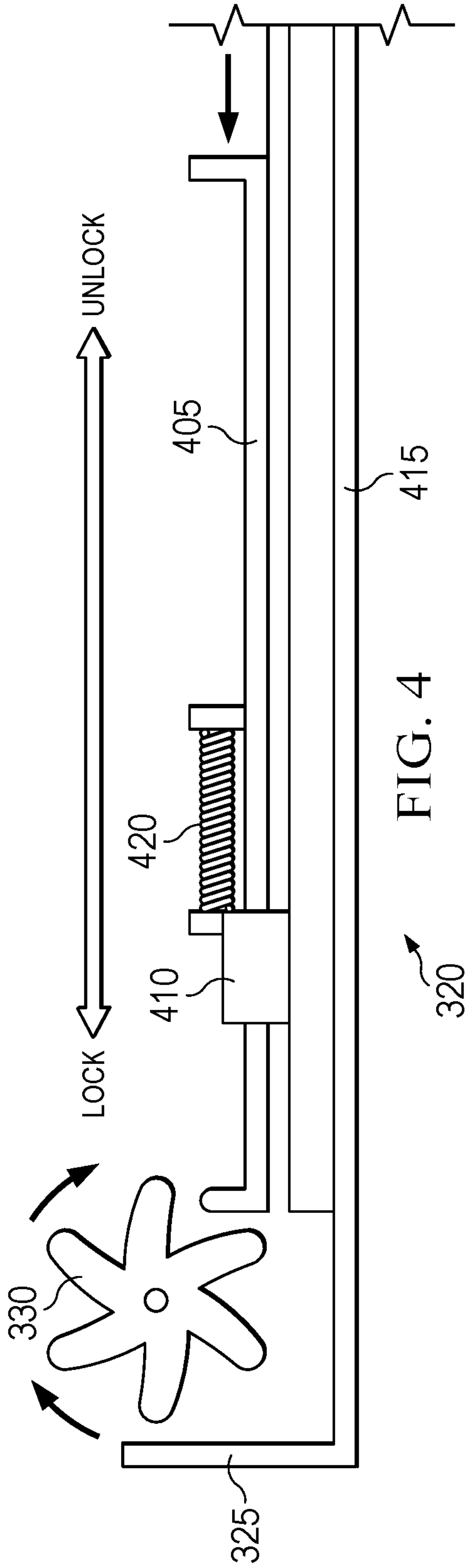
FIG. 4 is schematic diagram of an example of a latch that may be associated with the device of FIG. 3.

FIG. 4 is schematic diagram of an example of the latch 320 of FIG. 3, illustrating additional details that may be associated with some embodiment. As shown in the example of FIG. 4, the latch 320 may comprise a locking lever 405, which can be configured to slide within the latch 320. For example, a retention bar 410 can be coupled to the nose guard 325 or another support structure, such as a mounting bar 415, and the locking lever 405 can slide through the retention bar 410. The retention bar 410 can constrain movement of the locking lever 405 in other directions. The latch 320 may additionally comprise a spring 420, which may have a first end coupled to the retention bar 410 and a second end coupled to the locking lever 405.

In the example of FIG. 4, the starwheel 330 mounted or otherwise coupled to the mounting bar 415, and the locking lever 405 is in a locked position in which a first end of the locking lever 405 engages the starwheel 330 to prevent rotation of the starwheel 330. If the starwheel 330 is coupled to the strike 120 (shown in FIG. 1), this configuration can prevent the door 110 from opening. In operation, a force can be applied to a second end of the locking lever 405 to move the locking lever 405 to an unlocked position in which the first end of the locking lever 405 is disengaged from the starwheel 330. In the unlocked position, the starwheel 330 can be rotated, allowing the starwheel 330 to be released from the strike 120. In this configuration, the door 110 may be opened. If the force is removed from the second end of the locking lever 405, the spring 420 can apply a force to the locking lever 405 that causes the locking lever 405 to return to the locked position.

Figure 5:
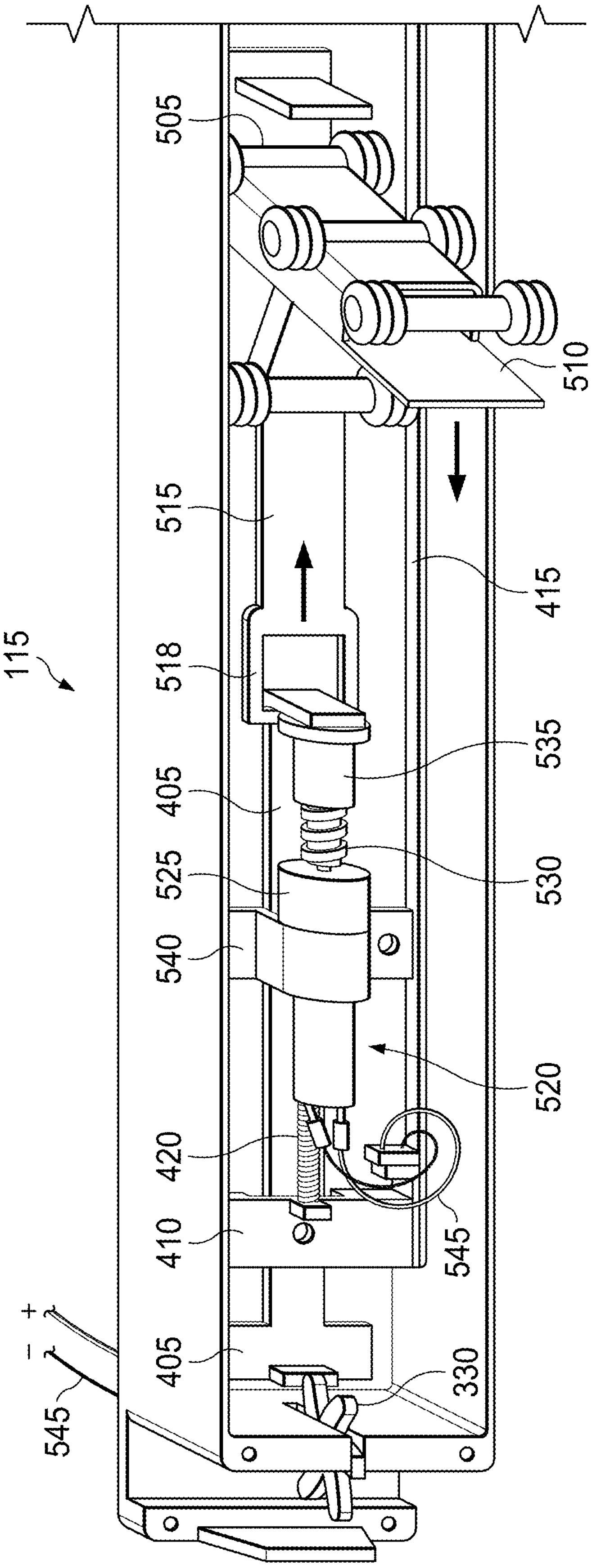
FIG. 5 is an auxiliary view of the exit device of FIG. 3.

FIG. 5 is an auxiliary view of the exit device 115 of FIG. 3, illustrating additional details that may be associated with some embodiments. In the example of FIG. 5, the activation bar 305 has been removed for illustration purposes. As shown, some embodiments of the exit device 115 may additionally comprise a pivot pin 505 coupled to the mounting bar 415, a pivot plate 510 coupled to the pivot pin 505, and a pivot arm 515 that couples the pivot plate 510 to the locking lever 405. In the example of FIG. 5, the pivot arm 515 has a sliding joint 518 configured to interface with the second end of the locking lever 405. The locking lever 405 of FIG. 5 is illustrated in a locked position, substantially similar to the locked position illustrated in the example of FIG. 4.

In operation, a force can be applied to the pivot plate 510, thereby causing the pivot plate 510 to rotate about the pivot pin 505. For example, with the activation bar 305 in place, the activation bar 305 may be pressed to apply a force to the pivot plate 510. Rotation of the pivot plate 510 can cause the pivot arm 515 to move away from the starwheel 330, thereby applying a force to the locking lever 405 and moving the locking lever 405 to the unlocked position, substantially as described with reference to the example of FIG. 4. In the example of FIG. 5, sliding joint 518 of the pivot arm 515 applies a pulling force on the locking lever 405. In the unlocked position, the starwheel 330 can be rotated, allowing the starwheel 330 to be released from the strike 120 (FIG. 1). In this configuration, the door 110 (FIG. 1) may be opened. If the force is removed from the pivot plate 510, and thereby removed from the locking lever 405, the spring 420 can apply a force to the locking lever 405 that causes the locking lever 405 to return to the locked position. In some embodiments, a spring may also be coupled to the pivot plate 510, the pivot arm 515, or both, to cause the pivot plate 510 to rotate in the opposite direction about the pivot pin 505 to return to the original position.

The exit device 115 of FIG. 5 further comprises an actuator 520. The actuator 520 of FIG. 5 generally comprises a motor 525, a lead screw 530, and a nut 535. In some embodiments, the spring 420 may be coupled to the retention bar 410, which is coupled to the mounting bar 415. The second end of the spring 420 may be coupled to the locking lever 405. The motor 525 may be coupled to the mounting bar 415. For example, the motor 525 may rest or otherwise be mounted on a bar (not visible in FIG. 5), which can be coupled to the mounting bar 415. In the example of FIG. 5, the bar may be disposed over the locking lever 405 to allow the locking lever 405 to slide beneath the bar. A retention clip 540 may be coupled to the bar over the motor 525 to secure the motor 525 in place relative to the mounting bar 415. A first end of the lead screw 530 may be operatively coupled to the motor 525, and a second end of the lead screw 530 may be in contact with or otherwise coupled to the locking lever 405. The motor 525 may be electrically coupled to conductors 545.

In operation, the conductors 545 may be coupled to a low-voltage, direct current source, such as a battery in the access control unit 205 (FIG. 2). The motor 525 can then be operated to control rotation of the lead screw 530. For example, if the access control unit 205 determines that access should be allowed, the access control unit 205 may deliver power to the motor 525 through the conductors 545, which can cause the motor 525 to rotate the lead screw 530 in a first direction. The rotation of the lead screw 530 in this first direction can move the nut 535 in a first direction, which can apply a force to the locking lever 405 and move the locking lever 405 to the unlocked position, substantially as described with reference to the example of FIG. 4. In the example of FIG. 5, the nut 535 applies a push force on the locking lever 405, which can cause the second end of the locking lever to move within the sliding joint 518 of the pivot arm 515. In the unlocked position, the starwheel 330 can be rotated, allowing the starwheel 330 to be released from the strike 120. In this configuration, the door 110 may be opened. If the polarity of the power to the motor 525 is reversed, the motor 525 can rotate the lead screw 530 in a second direction, which can remove the force from the locking lever 405. For example, the access control unit 205 may be configured to reverse polarity a few seconds after determining access should be allowed. As the force of the nut 535 is removed from the locking lever 405, the spring 420 can apply a force to the locking lever 405 that causes the locking lever 405 to return to the locked position.

Figure 6:
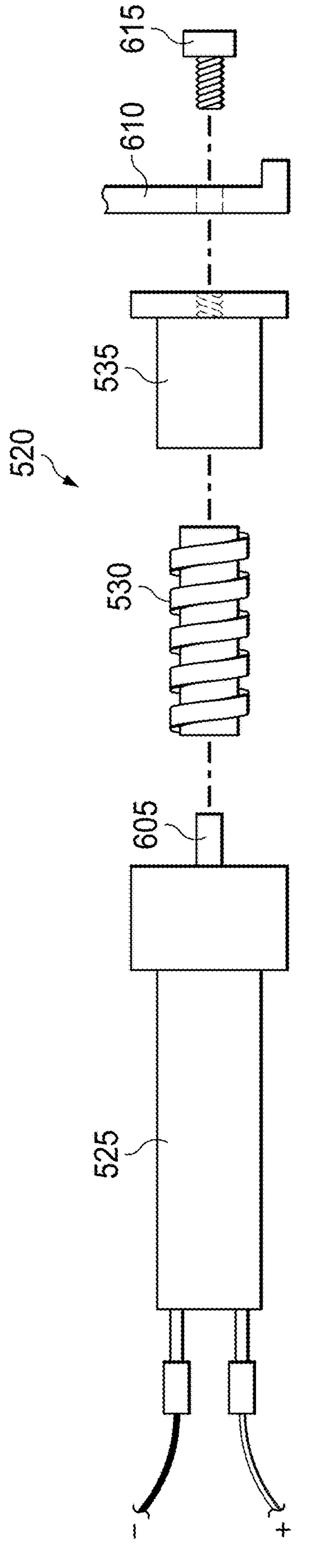
FIG. 6 is a schematic diagram of an example of an actuator that may be associated with the device of FIG. 5.

FIG. 6 is an assembly diagram of an example of the actuator 520, illustrating additional details that may be associated with some embodiments. For example, FIG. 6 illustrates an embodiment of the motor 525 having a shaft 605, which can be coupled to the lead screw 530. The nut 535 may be threaded onto the lead screw 530, and a plate 610 may be coupled to the nut 535 with a screw 615 or other suitable fastener. The plate 610 may be configured to engage a variety of locking levers and may be configured to prevent rotation of the nut 535 relative to the lead screw 530.

In general, components of the door system 100 may be coupled directly or indirectly. For example, the motor 525 may be directly coupled to the lead screw 530 and may be indirectly coupled to the locking lever 405 through the lead screw 530. Coupling may include fluid, mechanical, thermal, electrical, or chemical coupling (such as a chemical bond), or some combination of coupling in some contexts. For example, motor 525 may be mechanically coupled to the lead screw 530 and may be electrically coupled to the access control unit 205. In some embodiments, components may also be coupled by virtue of physical proximity, being integral to a single structure, or being formed from the same piece of material.

The systems, apparatuses, and methods described herein may provide significant advantages. Some embodiments may be particularly advantageous for reducing the cost of operating and maintaining doorway exit devices. For example, some embodiments can be installed without installing additional power sources or connecting to utility power sources, which can significantly reduce installation cost and allow installation in locations without utility power.

While shown in a few illustrative embodiments, a person having ordinary skill in the art will recognize that the systems, and apparatuses described herein are susceptible to various changes and modifications that fall within the scope of the appended claims. Moreover, descriptions of various alternatives using terms such as "or" do not require mutual exclusivity unless clearly required by the context, and the indefinite articles "a" or "an" do not limit the subject to a single instance unless clearly required by the context. Components may also be combined or eliminated in various configurations for purposes of sale, manufacture, assembly, or use. For example, in some configurations, the actuator 520 may be separated from or combined with other components in various ways for sale, manufacture, assembly, or use.

The claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims.

The invention claimed is:

1. An apparatus for controlling a door, the apparatus comprising:

a mounting bar configured to be coupled to the door;

a latch coupled to the mounting bar, the latch comprising a locking lever;

a lead screw;

a nut threaded onto the lead screw and configured to engage the locking lever; and a motor comprising a shaft, wherein the shaft is coupled to the lead screw and the motor is configured to operate the shaft and the lead screw to push the nut against the locking lever to move the locking lever from a locked position to an unlocked position.

2. The apparatus of claim 1, further comprising:

a spring configured to return the locking lever to the locked position if the motor retracts the nut from the locking lever.

3. The apparatus of claim 1, further comprising:

a spring configured to return the locking lever to the locked position if the motor retracts the nut from the locking lever; and the motor is further configured to operate on direct current at less than twelve volts.

4. The apparatus of claim 1, wherein:

the latch comprises a starwheel coupled to the mounting bar; and the motor is configured to move the locking lever between the locked position in which the locking lever prevents rotation of the starwheel to the unlocked position in which the locking lever allows rotation of the starwheel.

5. The apparatus of claim 1, wherein:

the latch comprises a starwheel coupled to the mounting bar;

the motor is configured to operate on direct current at less that twelve volts to rotate the lead screw in a first direction to push the nut against the locking lever to move the locking lever from the locked position to the unlocked position and in a second direction to retract the nut from the locking lever;

a spring is configured to return the locking lever to the locked position if the motor retracts the nut from the locking lever; and the locking lever prevents rotation of the starwheel in the locked position and allows rotation of the starwheel in the unlocked position.

6. The apparatus of claim 1, the apparatus further comprising:

a pivot pin coupled to the mounting bar;

a pivot plate coupled to the pivot pin; and a pivot arm that couples the pivot plate to the locking lever;

wherein the pivot plate is configured to rotate about the pivot pin to move the locking lever to the unlocked position.

7. A system for controlling access to a door, the system comprising:

a strike configured to be coupled to a frame around the door;

a mounting bar coupled to the door;

a latch coupled to the mounting bar and configured to engage the strike, the latch comprising a locking lever;

an actuator configured to move the locking lever between a locked position in which the locking lever prevents release of the latch from the strike to an unlocked position in which the locking lever allows release of the latch from the strike; and an access control unit configured to operate the actuator on direct current of less than twelve volts; wherein the actuator comprises:

a lead screw;

a nut threaded onto the lead screw and configured to engage the locking lever; and a motor configured to operate the lead screw to push the nut against the locking lever to move the locking lever from the locked position to the unlocked position.

8. A system for controlling access to a door, the system comprising:

a strike configured to be coupled to a frame around the door;

a mounting bar coupled to the door;

a latch coupled to the mounting bar and configured to engage the strike, the latch comprising a locking lever;

an actuator configured to move the locking lever between a locked position in which the locking lever prevents release of the latch from the strike to an unlocked position in which the locking lever allows release of the latch from the strike; and an access control unit configured to operate the actuator on direct current of less than twelve volts; wherein the actuator comprises:

a lead screw;

a nut threaded onto the lead screw and configured to engage the locking lever;

a motor configured to operate the lead screw in a first direction to push the nut against the locking lever to move the locking lever from the locked position to the unlocked position and in a second direction to retract the nut from the locking lever; and a spring configured to return the locking lever to the locked position if the motor retracts the nut from the locking lever.

9. A system for controlling access to a door, the system comprising:

a strike configured to be coupled to a frame around the door;

a mounting bar coupled to the door;

a latch coupled to the mounting bar and configured to engage the strike, the latch comprising a locking lever;

an actuator configured to move the locking lever between a locked position in which the locking lever prevents release of the latch from the strike to an unlocked position in which the locking lever allows release of the latch from the strike; and an access control unit configured to operate the actuator on direct current of less than twelve volts; wherein the actuator comprises:

a lead screw;

a nut threaded onto the lead screw and configured to engage the locking lever;

a motor configured to rotate the lead screw in a first direction to push the nut against the locking lever to move the locking lever from the locked position to the unlocked position and in a second direction to retract the nut from the locking lever;

a spring configured to return the locking lever to the locked position if the motor retracts the nut from the locking lever; and the motor is further configured to operate on direct current from the access control unit at less than twelve volts.

10. A system for controlling access to a door, the system comprising:

a strike configured to be coupled to a frame around the door;

a mounting bar coupled to the door;

a latch coupled to the mounting bar and configured to engage the strike, the latch comprising a locking lever;

an actuator configured to move the locking lever between a locked position in which the locking lever prevents release of the latch from the strike to an unlocked position in which the locking lever allows release of the latch from the strike; and an access control unit configured to operate the actuator on direct current of less than twelve volts; wherein:

the latch comprises a starwheel coupled to the mounting bar;

the actuator comprises a lead screw, a nut, a motor, and a spring;

the nut is threaded onto the lead screw and configured to engage the locking lever;

the motor is configured to operate on direct current from the access control unit at less that twelve volts to rotate the lead screw in a first direction to push the nut against the locking lever to move the locking lever from the locked position to the unlocked position and in a second direction to retract the nut from the locking lever;

the spring is configured to return the locking lever to the locked position if the motor retracts the nut from the locking lever; and the locking lever prevents rotation of the starwheel in the locked position and allows rotation of the starwheel in the unlocked position.

* * * * *